US00RE43591E

(19) United States
(12) Reissued Patent
Kim

(10) Patent Number: US RE43,591 E
(45) Date of Reissued Patent: Aug. 21, 2012

(54) METHOD AND APPARATUS FOR PRINTING ACCESSED DATA OVER A NETWORK USING A VIRTUAL MACHINE APPLET

(75) Inventor: Dae-Hyun Kim, Seoul (KR)

(73) Assignee: Samsung Electronics Co., Ltd., Suwon-Si (KR)

(21) Appl. No.: 13/067,394

(22) Filed: May 27, 2011

Related U.S. Patent Documents

Reissue of:
(64) Patent No.: 7,542,157
Issued: Jun. 2, 2009
Appl. No.: 10/374,707
Filed: Feb. 27, 2003

(30) Foreign Application Priority Data

Jun. 18, 2002 (KR) ..... 2002-34133

(51) Int. Cl.
*G06F 15/00* (2006.01)
*G06F 3/12* (2006.01)
*G06K 1/00* (2006.01)
*G06K 15/00* (2006.01)

(52) U.S. Cl. ..... 358/1.15; 358/1.13; 358/1.18

(58) Field of Classification Search ..... None
See application file for complete search history.

(56) References Cited

U.S. PATENT DOCUMENTS

| | | | | |
|---|---|---|---|---|
| 7,301,658 | B2 | 11/2007 | Henry | |
| 2002/0171857 | A1 | 11/2002 | Hisatomi et al. | |
| 2003/0020948 | A1 | 1/2003 | Jarvis et al. | |
| 2003/0030664 | A1 * | 2/2003 | Parry | 345/744 |

FOREIGN PATENT DOCUMENTS

| | | |
|---|---|---|
| JP | 11-316658 | 11/1999 |
| JP | 2000-148424 | 5/2000 |
| JP | 2000-276339 | 10/2000 |
| JP | 2000-284926 | 10/2000 |
| JP | 2000-330908 | 11/2000 |

(Continued)

OTHER PUBLICATIONS

Patent Abstracts Of Japan, "Network Print System, And Printer And Client Device Used In Same System," publication No. 2000-148424, May 30, 2000, 1 page.

(Continued)

*Primary Examiner* — Douglas Tran
(74) *Attorney, Agent, or Firm* — Staas & Halsey LLP

(57) ABSTRACT

A method and apparatus for printing accessed data over a network using a virtual machine applet accessed by a printer. To-be-printed data accessed through a network or setup command data for setting up a printer environment received from a user is transformed into to-be-printed extensible markup language (XML) data or setup command XML data, respectively. The to-be-printed XML data or the setup command XML data is transmitted to the printer. The to-be-printed XML data or the setup command XML data is interpreted via the virtual machine applet to execute printing or to set up the printer. Accordingly, data written in various kinds of languages on the Internet can be transmitted to and printed by a printer without installing a printer driver in a computer or a mobile communication apparatus like a PDA. Also, a desired printer setup by a user can be achieved without a printer driver.

14 Claims, 6 Drawing Sheets

FOREIGN PATENT DOCUMENTS

JP 2001-290614 10/2001

OTHER PUBLICATIONS

Japanese Office Action dated Jan. 31, 2006 issued by the Japanese Patent Office in Japanese Patent Application No. 2003-171129 corresponding to the present above-identified pending US patent application, 2 pages.

Japanese Office Action for corresponding Japanese Patent Application No. 2003-171129 dated Dec. 5, 2006.

Korean Office Action dated Jun. 30, 2004; issued in corresponding Korean Patent No. 10-2002-0034133.

Korean Office Action dated Jun. 30, 2004, issued in corresponding Korean Patent No. 10-2002-0034133.

* cited by examiner

METHOD AND APPARATUS FOR PRINTING ACCESSED DATA OVER A NETWORK USING A VIRTUAL MACHINE APPLET

Matter enclosed in heavy brackets [ ] appears in the original patent but forms no part of this reissue specification; matter printed in italics indicates the additions made by reissue.

CROSS-REFERENCE TO RELATED APPLICATIONS

This application claims the priority of Korean Patent Application No. 2002-34133, filed Jun. 18, 2002, in the Korean Intellectual Property Office, the disclosure of which is incorporated herein in its entirety by reference.

BACKGROUND OF THE INVENTION

1. Field of the Invention

The present invention relates to the field of printing data on a network using a printer connected to a computer, and more particularly, to a method of and an apparatus printing accessed data over a network using a virtual machine applet.

2. Description of the Related Art

In the related art, to print data from the Internet, a computer directly accesses data from a web server (not shown), creates printer data using an application program and a printer driver, and transfers the printer data to a printer. Recently, since mobile devices, such as a PDA or an Internet phone, are becoming widespread, printing through these devices is on demand. In order to print data from the Internet, a mobile device brings data from a web server through the wireless Internet, makes printer data using an application program and a printer driver, which are built in the mobile device, and transmits the printer data to a printer. The printer data sent to the printer is analyzed and divided into data to be printed and data not to be printed. Printing is executed on the data to be printed. When a printer setup value is input through a printer driver, the printer setup value is also transmitted to a printer as the printer data, and the printer is then set.

However, when computers or mobile devices having a small capacity of memory must output a particular form of work-related document, the diversity of document types makes it difficult to output a document to a printer through a printer driver in real time because of the great limitations in capacity, program installation, and the like. Further, since present computers or mobile devices have different printer drivers suitable for different operating systems (OS) used by the computers or the mobile devices, printer drivers corresponding to all types of computers or mobile devices must be developed, thereby creating a manufacturing inefficiency. Further, since the output operation of a mobile device in an enterprise-type solution must support various kinds of OSs and application programs, mobile devices having a small capacity of memory and a low-speed CPU cannot rapidly process/support high volume databases and printing information therefrom.

SUMMARY OF THE INVENTION

The present invention provides a method of printing accessed data over a network using a printer virtual machine applet, in which the printer interprets extensible markup language (XML) data by using the virtual machine applet, so that data written in various languages on the Internet can be printed without the need to install a printer driver in a computer or mobile communication devices, such as a PDA.

According to an aspect of the present invention, an apparatus/a system prints accessed data over a network using a printer virtual machine applet.

Additional aspects and advantages of the invention will be set forth in part in the description which follows and, in part, will be obvious from the description, or may be learned by practice of the invention.

According to an aspect of the present invention, there is provided a method of printing accessed data over a network using a virtual machine applet in a printer connected to a computer. In this method, first, to-be-printed data accessed through the network or setup command data for setting up a printer environment received from a user is transformed into to be-printed XML data or setup command XML data, respectively. The to-be-printed XML data and the setup command XML data are written in an extensible markup language (XML). Thereafter, the to-be-printed XML data or the setup command XML data is transmitted to the printer. Next, the to-be-printed XML data or the setup command XML data is interpreted by the printer to execute printing or to set up the printer, respectively.

According to another aspect of the present invention, there is provided an apparatus/a system printing accessed data over a network using a virtual machine applet in a printer connected to a computer. In this apparatus, a printer setup interface receives a setup command for setting up a printer environment from a user and outputs setup command data. An XML data transformation/transmission unit transforms to-be-printed data accessed through the network or setup command data received from the user into to-be-printed XML data or setup command XML data, respectively, and transmits the to-be-printed XML data or the setup command XML data to the printer. In the printer, an XML data processor interprets the to-be-printed XML data or the setup command XML data to execute printing or to set up the printer, respectively.

BRIEF DESCRIPTION OF THE DRAWINGS

The above and/or other advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
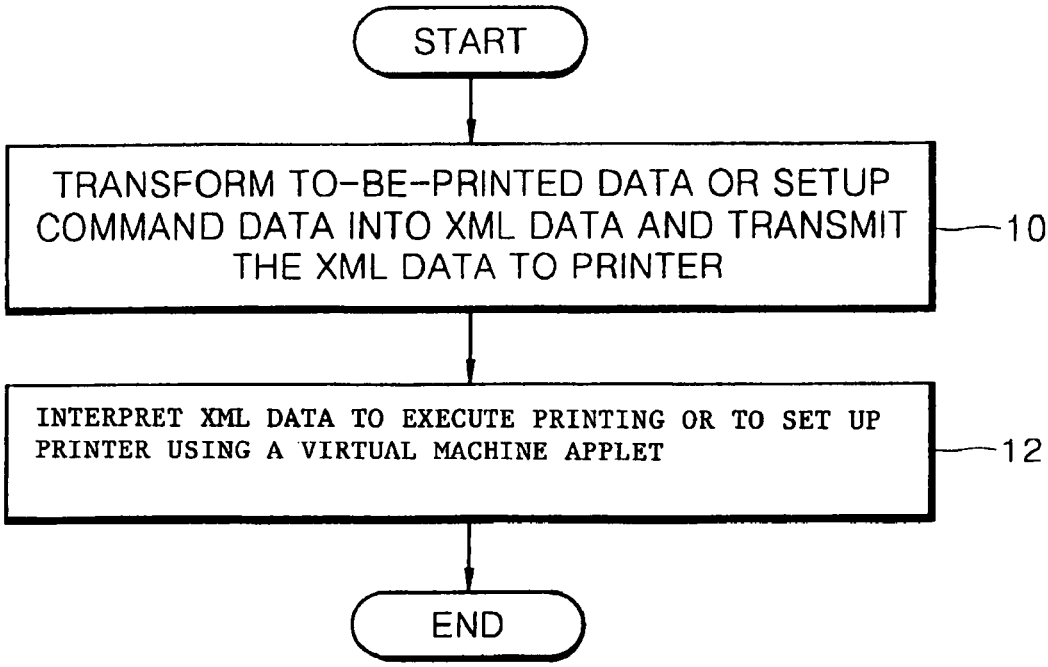
FIG. 1 is a flowchart of printing accessed data over a network using a virtual machine applet, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, a method of printing accessed data over a network using XML data and a virtual machine applet, according to an embodiment of the present invention, comprises, at operation 10, transmitting extensible markup language (XML) data (XML documents) to a printer, and, at operation 12 interpreting the XML data via a virtual machine applet to execute printing or to set up a printer environment.

To be more specific, at operation 10, to-be-printed data accessed through a network or setup command data for setting the printer environment received from a user, is transformed into to-be-printed XML data or setup command XML data, respectively. Subsequently, at operation 10, the to-be-printed XML data or the setup command XML data is transmitted to a printer. A user can access data to be printed by connecting to a web server (not shown) through a computer or a PDA. Such to-be-printed data can be written in various languages or various formats.

More particularly, at operation 10, the to-be-printed data is transformed into to-be-printed XML data, which is a communication markup language used on the Internet. XML data is excellent in Internet home page building and performing searches, and facilitates complicated data processing conducted in a client system. For example, with XML data, Internet users can easily write and manage content to be added to Internet web pages. Also, users can manipulate structured databases written in XML, as desired. Meanwhile, at operation 10, when a user inputs setup command data to establish a desired printer environment, the input setup command data is transformed into setup command XML data. Therefore, at operation 10, the to-be-printed XML data or the setup command XML data is transmitted to a printer, for example, via a data transmission interface (not shown). Typically, the transmission of to-be-printed XML data (XML documents) reduces a data transmission burden compared to transmission of to-be-printed data produced by a printer driver. At operation 12, the to-be-printed XML data or the setup command XML data transmitted to a printer is interpreted in the printer via a virtual machine applet to execute printing or to set up a desired printer environment.

Figure 2:
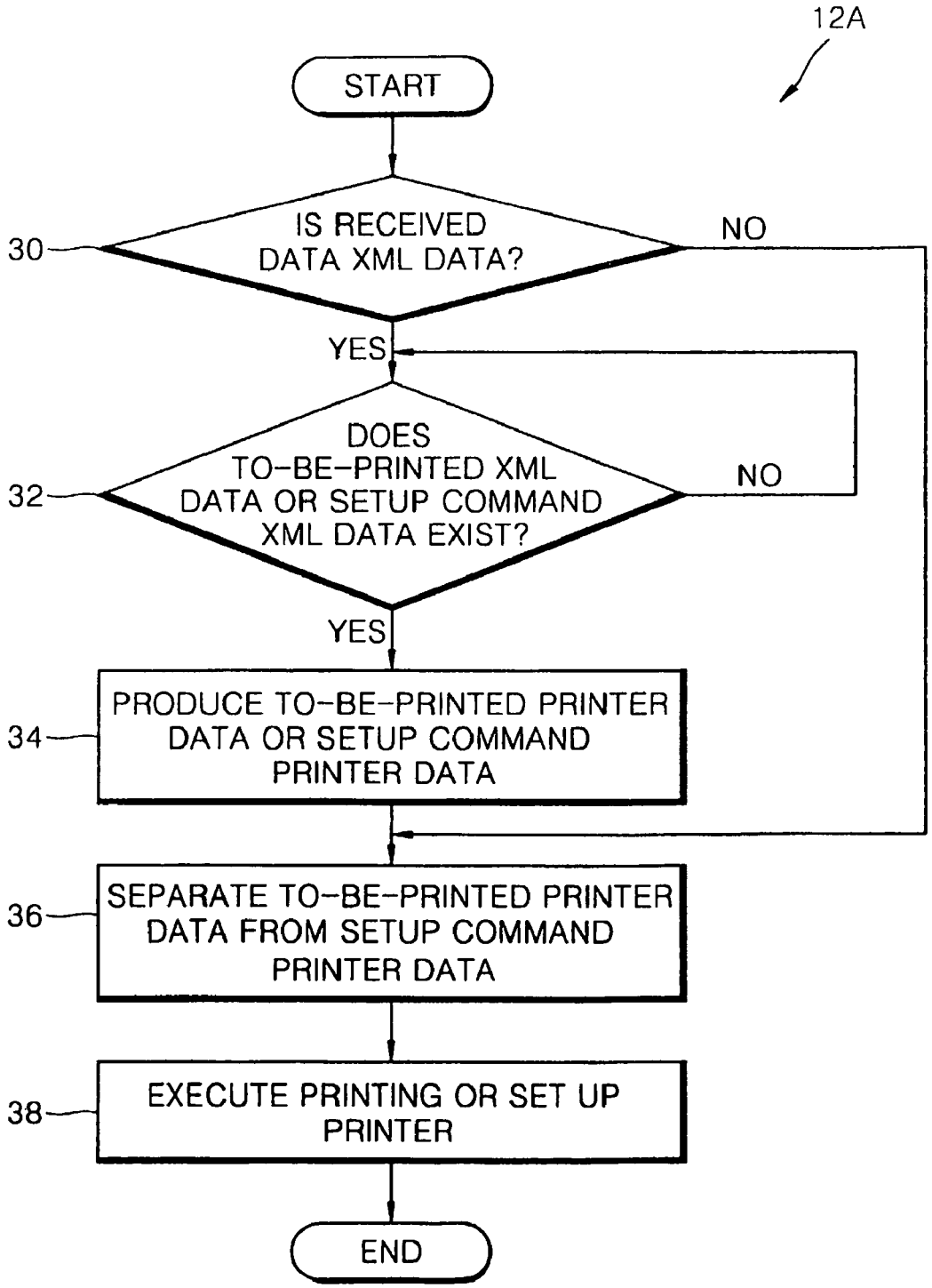
FIG. 2 is a flowchart of operation 12 of FIG. 1, according to an embodiment of the present invention.

FIG. 2 is a flowchart of operation 12 of FIG. 1, according to an embodiment 12A of the present invention. The received XML data (XML printer data) interpreting process 10 at the printer, comprises operations 30 through 38 of producing to-be-printed printer data or setup command printer data from the received to-be-printed XML data or setup command XML data and executing printing or setting up a printer environment according to the produced printer data.

First, at operation 30, it is determined whether received data is XML data. The received data may be either XML data or printer data. If, at operation 30, it is determined that the received data is not XML data, at operations 36 and 38, printing or setting up a printer environment operation is executed, according to the received to-be-printed printer data or setup command printer data. On the other hand, if, at operation 30, it is determined that the received data is XML data, at operation 32, another determination is made as to whether the to-be-printed XML data or the setup command XML data exist. If, at operation 32, it is determined that the to-be-printed XML data or the setup command XML data does not exist, operation 32 is repeated (i.e., if, at operation 32, to-be-printed XML data or setup command XML data does not exist, the printer continues to check for receipt of XML printer data).

However, if, at operation 32, it is determined that to-be-printed XML data or setup command XML data exists, at operation 34, to-be-printed printer data or setup command printer data is produced from the to-be-printed XML data or the setup command XML data, respectively, using a virtual machine applet interpreting the received XML data. Typically, a virtual machine is installed on various client platforms in a client-server network architecture, such as the Internet, in executing operating systems (e.g., Window 95/98/NT, Unix, or Macintosh) or web browsers (e.g., Internet explorer or Netscape) of the client platforms, and the virtual machine provides a foundation to execute a virtual machine applet transmitted to the client.

In particular, typically, at operations 12 and 34, the virtual machine applet of the present invention is an XML virtual machine applet that interprets XML data received from a computer or a PDA into appropriate data for executing a printer operation. Accordingly, at operation 34, the XML virtual machine applet interprets received to-be-printed XML data, so that data allowing a printer to execute printing, that is, to-be-printed printer data, is produced from the received to-be-printed XML data. In particular, since typically the XML virtual machine applet can have a template of to-be-printed printer data, to-be-printed printer data can be produced by locating received to-be-printed XML data in the template of the to-be-printed printer data. The XML virtual machine applet also interprets received setup command XML data, so that data that allows a printer to be set up, that is, setup command printer data, is produced from the received setup command XML data.

Figure 3:
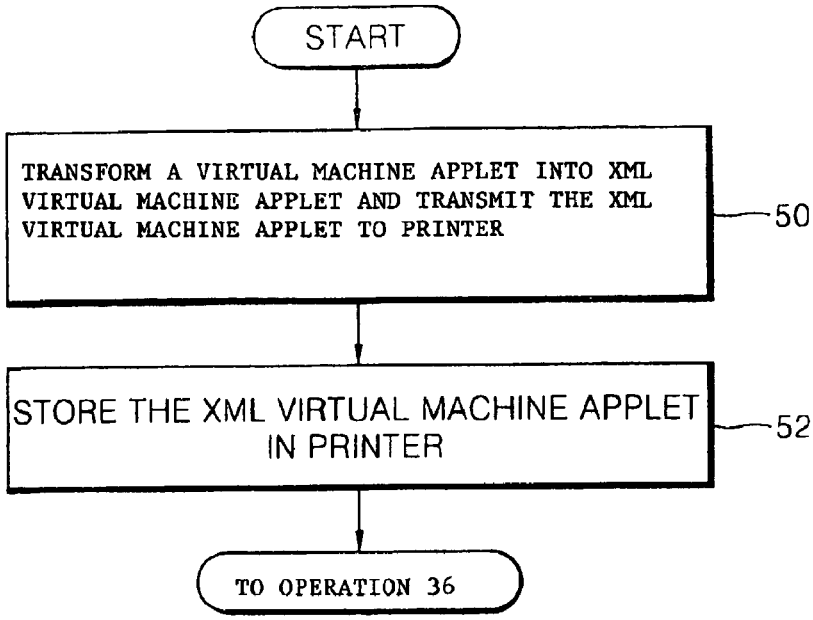
FIG. 3 is a flowchart of storing an XML virtual machine applet in a printer, according to embodiment of the present invention.

FIG. 3 is a flowchart of storing an XML virtual machine applet in a printer, according to an embodiment of the present invention. The generation and storage of a printer XML virtual machine applet, which is used at operation 12 of FIG. 1 comprises operations 50 and 52 of transforming a virtual machine applet into an XML virtual machine applet, transmitting the XML virtual machine applet to a printer, and storing the XML virtual machine applet in a printer.

More particularly, typically, at operation 50, a virtual machine applet accessed via a network is first transformed into an XML virtual machine applet, and the transformed XML virtual machine applet is transmitted to the printer. The virtual machine applet, which can be written in various kinds of languages, is transformed into an XML virtual machine applet written in XML, which is a communication language used on the Internet. The XML virtual machine applet is transmitted to the printer via a data transmission interface. At operation 52, the XML virtual machine applet transmitted to the printer is stored in the printer. According to an aspect of the present invention, the XML virtual machine applet may be pre-stored in a printer. According to another aspect of the present invention, operation 52 may be performed at operation 34 to store a received XML virtual machine applet, as part of preparing a printer to print XML printer data. According to an aspect of the present invention, at operation 50, the XML virtual machine applet may be first accessed from a network and transmitted to a printer, and then, at operation 52, stored in the printer.

Figure 4:
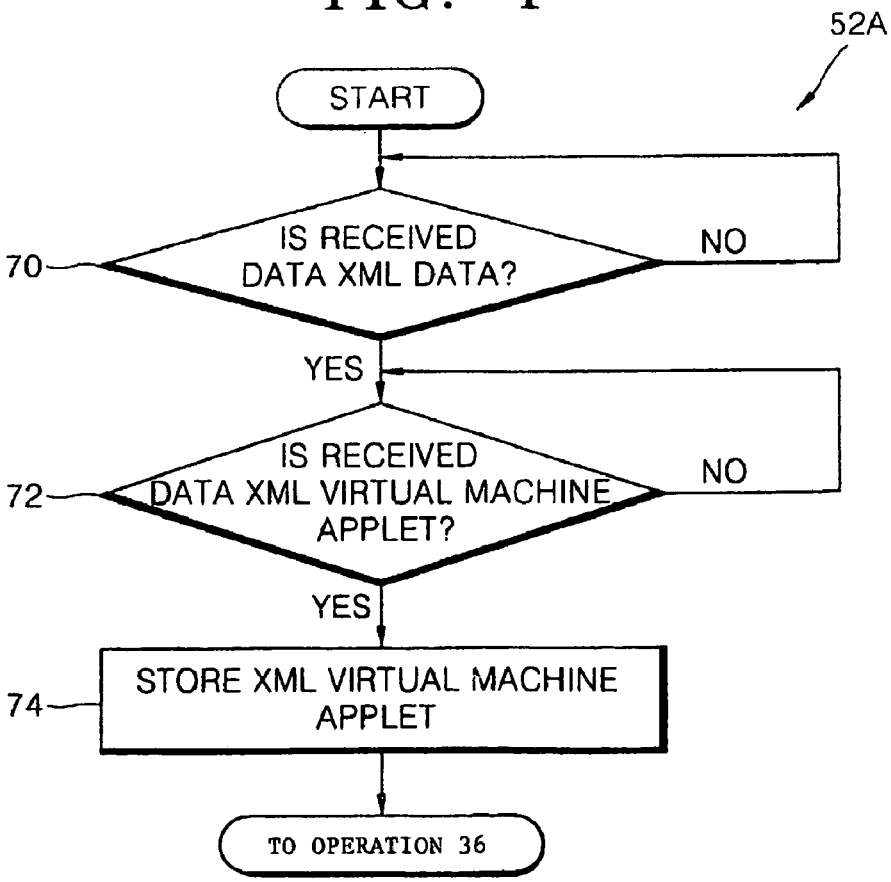
FIG. 4 is a flowchart of operation 52 of FIG. 3, according to an embodiment of the present invention.

FIG. 4 is a flowchart of operation 52 of FIG. 3 according to an embodiment 52A of the present invention. Storage of the XML virtual machine applet in the printer comprises operations 70 through 74 of determining whether received data is an XML virtual machine applet and storing the XML virtual machine applet. In particular, at operation 70, it is determined whether received data is XML data. If, at operation 70, it is determined that the received data is not XML data, operation 70 is repeated (i.e., no further action is performed until further data receipt). However, if, at operation 70, it is determined that the received data is XML data, at operation 72, another determination is made as to whether the received data is an XML virtual machine applet, in step 72. If, at operation 72, it is determined that the received data is not an XML virtual machine applet, operation 72 is repeated (i.e., the printer continues to check for receipt of XML virtual machine applet data). However, if, at operation 72, it is determined that the received data is an XML virtual machine applet, at operation 74, the XML virtual machine applet is stored.

Referring back to FIG. 2, after operation 34, or if, at operation 30, it is determined that the received data is not XML data, at operation 36, the produced to-be-printed printer data is separated from setup command printer data. According to an aspect of the present invention, the to-be-printed printer data and the setup command printer data may be independently produced from the to-be-printed XML data and the setup command XML data, respectively. However, since they may also be produced at the same time, the produced to-be-printed printer data must be distinguished from the produced setup command printer data to either execute printing or to set up the printer. At operation 38, the produced to-be-printed printer data or the produced setup command printer data is used to execute printing or to set up the printer.

Figure 5:
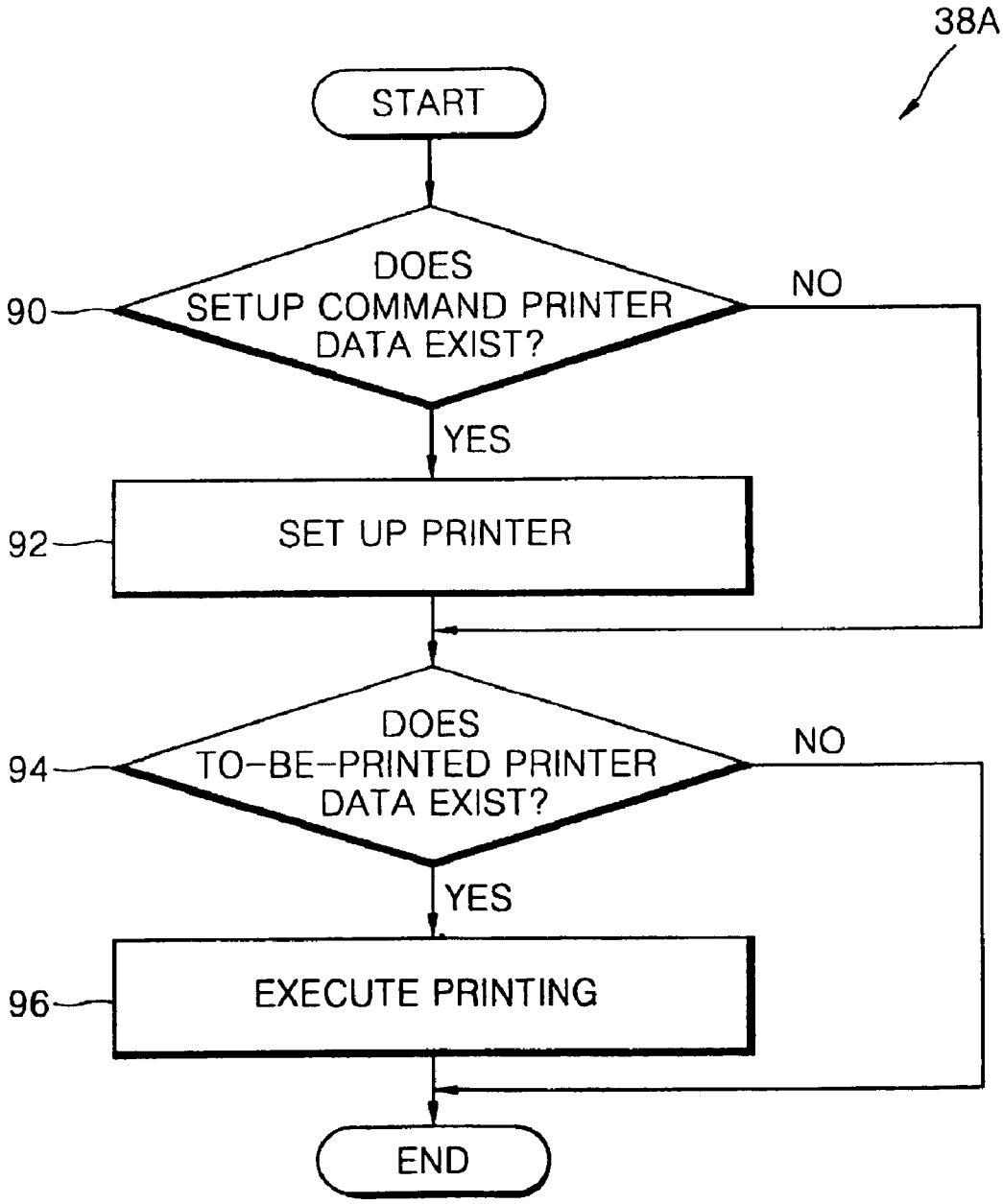
FIG. 5 is a flowchart of operation 38 of FIG. 2, according to an embodiment of the present invention.

FIG. 5 is a flowchart of operation 38 of FIG. 2, according to an embodiment 38A of the present invention. The printing or setting up the printer, using the produced printer data from operation 36, comprises operations 90 through 96. At operation 90, it is first determined whether setup command printer data exists. If, at operation 90, it is determined that setup command printer data does not exist, at operation 94, it is determined whether to-be-printed printer data exists. However, if, at operation 90, it is determined that setup command printer data exists, at operation 92, the printer is set up.

After operation 92, or if, at operation 90, it is determined that no setup command printer data exists, at operation 94, it is determined whether to-be-printed printer data exists. If, at operation 94, it is determined that no to-be-printed printer data exists, the method is concluded. However, if, at operation 94, it is determined that to-be-printed printer data exists, at operation 96, printing is executed.

Figure 6:
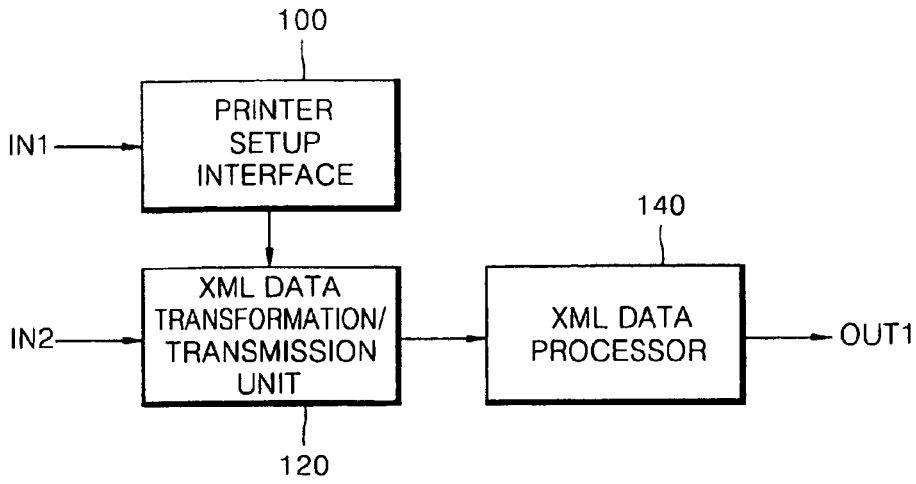
FIG. 6 is a block diagram of a system printing accessed data over a network using a printer virtual machine applet by implementing the process of FIG. 1, according to an embodiment of the present invention.

FIG. 6 is a block diagram of an apparatus/system printing accessed data over a network using a printer virtual machine applet, according to an embodiment of the present invention. The apparatus of FIG. 6 performs/implements the printing method of FIG. 1 and comprises a printer setup interface 100, an XML data transformation/transmission unit 120, and an XML data processor 140. The printer setup interface 100 performs operation 10 by receiving, for example, a setup command for setting up a printer environment from a user and outputting a result. If a setup command is received via an input port IN1, setup command data is transmitted to the XML data transformation/transmission unit 120. In the present invention, since a printer driver is not installed in a computer or a mobile communication device like a PDA, a user needs an extra interface to set up an environment for a printer, such as the printing size, the number of printing paper sheets, or the like. Accordingly, in the present invention, a user can input a setup command for a desired printer environment via the printer setup interface 100, and then setup command data is transmitted to the XML data transformation/transmission unit 120.

Subsequently, to further perform operation 10, the XML data transformation/transmission unit 120 transforms to-be-printed data accessed via a network or the setup command data received from the user, into to-be-printed XML data or setup command XML data, respectively, and transmits the to-be-printed XML data or the setup command XML data to a printer. For example, to-be-printed data accessed through an input port IN2 or the setup command data received from the printer setup interface 100 is transformed into to-be-printed XML data or setup command XML data, respectively, in the XML data transformation/transmission unit 120, and the to-be-printed XML data or setup command XML data is transmitted to the XML data processor 140. Meanwhile, to perform operation 50, typically, the XML data transformation/transmission unit 120 transforms a virtual machine applet accessed via a network into an XML virtual machine applet and transmits the XML virtual machine applet to a printer.

In FIG. 6, the XML data processor 140 performs operation 12 by interpreting the to be-printed XML data or the setup command XML data transmitted to the printer to execute printing or to set up the printer. For example, the to-be-printed XML data or the setup command XML data received from the XML data transformation/transmission unit 120 is analyzed, and, consequently, a signal for printing or a signal for printer setup is output to an output port OUT1. Meanwhile, to perform operation 52, the XML data processor 140 stores an XML virtual machine applet, which is received from the XML data processor 140, in the printer. In FIG. 6, processes of the present invention as embodied in the printer setup interface 100, the XML data transformation/transmission unit 120, and the XML data processor 140 are implemented in computing hardware and/or software in a computing device, such as a computer, PDA, etc., with printing functions (i.e., the XML data processor 140 is integrated with a computing device). According to an aspect of the present invention, the XML data processor 140 may be implemented separately in a printer that is in communication with a computing device, the computing device comprising the printer setup interface 100 and the XML data transformation/transmission unit 120 to communicate with the printer.

Figure 7:
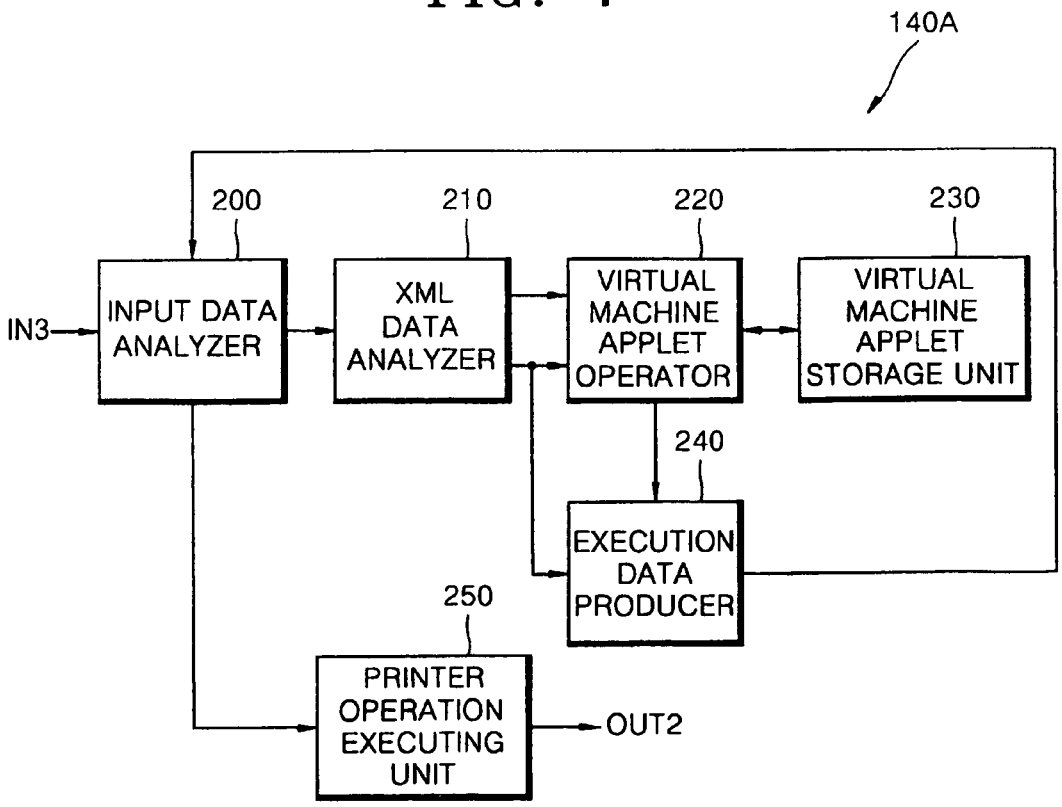
FIG. 7 is a block diagram of the XML data processor of FIG. 6, according to an embodiment of the present invention.

FIG. 7 is a block diagram of the XML data processor 140 of FIG. 6, according to an embodiment 140A of the present invention. The embodiment 140A comprises an input data analyzer 200, an XML data analyzer 210, a virtual machine applet operator 220, a virtual machine applet storage unit 230, an execution data producer 240, and a printer operation executing unit 250.

The input data analyzer 200 performs operation 30 by analyzing received data to determine whether the received data is XML data, to-be-printed printer data, or setup command printer data and outputs the result of the analysis as a first signal. The input data analyzer 200 may receive XML data, to-be-printed printer data, or setup command printer data from a computer or a PDA. Alternatively, the input data analyzer 200 may receive to-be-printed printer data or setup command printer data from the execution data producer 240. If the input data analyzer 200 determines that the data received via an input port IN3 or data received from the execution data producer 240 is to-be-printed printer data or setup command printer data, respectively, the to-be-printed printer data or the setup command printer data is transmitted to the printer operation execution unit 250. On the other hand, if the input data analyzer 200 determines that the received data is XML data, the XML data is transmitted to the XML data analyzer 210.

The XML data analyzer 210 performs operation 32 by determining whether the XML data is to-be-printed XML data or setup command XML data in response to the first signal of the input data analyzer 200 indicating receipt of XML data and outputs the result of the analysis as a second signal. The XML data analyzer 210 also determines whether the XML data is an XML virtual machine applet. If the data received from the input data analyzer 200 is to-be-printed XML data or setup command XML data, the to-be-printed XML data or setup command XML data is transmitted to the execution data producer 240. On the other hand, if the data received from the input data analyzer 200 is an XML virtual machine applet, the XML virtual machine applet is transmitted to the virtual machine applet operator 220.

Typically, the virtual machine applet operator 220, the virtual machine applet storage unit 230, and the execution data producer 240 perform operations 34 and 52. In response to the second signal of the XML data analyzer 210, the virtual machine applet operator 220 either stores or fetches an XML virtual machine applet for interpreting the XML data.

When the received XML data is not an XML virtual machine applet, the XML data as the to-be-printed XML data or the setup command XML data is transmitted to the execution data producer 240 and the virtual machine applet operator 220 fetches an XML virtual machine applet stored in the virtual machine applet storage unit 230 and transmits the same to the execution data producer 240. The execution data producer 240 receives an XML virtual machine applet from the virtual machine applet operator 220 in response to the second signal of the XML data analyzer 210, produces to-be-printed printer data or setup command printer data from the to-be-printed XML data or the setup command XML data, respectively, received from the XML data analyzer 210, and outputs the to-be-printed printer data or the setup command printer data. To be more specific, the execution data producer 240 produces the to-be-printed printer data from the to-be-printed XML data using the received XML virtual machine applet for interpreting XML data. In particular, since the XML virtual machine applet has a template of the to-be-printed printer data, the to-be-printed printer data can be produced by locating the received to-be-printed XML data in the template of the to-be-printed printer data. The execution data producer 240 also produces the setup command printer data from the setup command XML data using the received XML virtual machine applet for interpreting XML data. The execution data producer 240 outputs the produced to-be-printed printer data or the setup command printer data to the input data analyzer 200.

When the received XML data is an XML virtual machine applet, the XML data as the XML virtual machine applet is transmitted to the virtual machine applet operator 220, which stores the received XML virtual machine applet in the virtual machine applet storage unit 230. More particularly, the input data analyzer 200 performs operation 70 by analyzing whether the received data is XML data and outputs the analysis result as a third signal. The XML data analyzer 210 performs operation 72 by analyzing whether the XML data is an XML virtual machine applet in response to the third signal transmitted by the input data analyzer 200 and outputs the analysis result as a fourth signal. The virtual machine applet operator 220 performs operations 74 and 52 by storing the XML virtual machine applet in the virtual machine applet storage unit 230 in response to the fourth signal received from the XML data analyzer 210.

The printer operation executing unit 250 performs operation 38 by executing printing or setting up a printer using the to-be-printed printer data or setup command printer data analyzed and transmitted by the input data analyzer 200. For example, a result regarding the printing execution or printer setup obtained using the to-be-printed printer data or the setup command printer data transmitted by the input data analyzer 200 is output to an output port OUT2.

Figure 8:
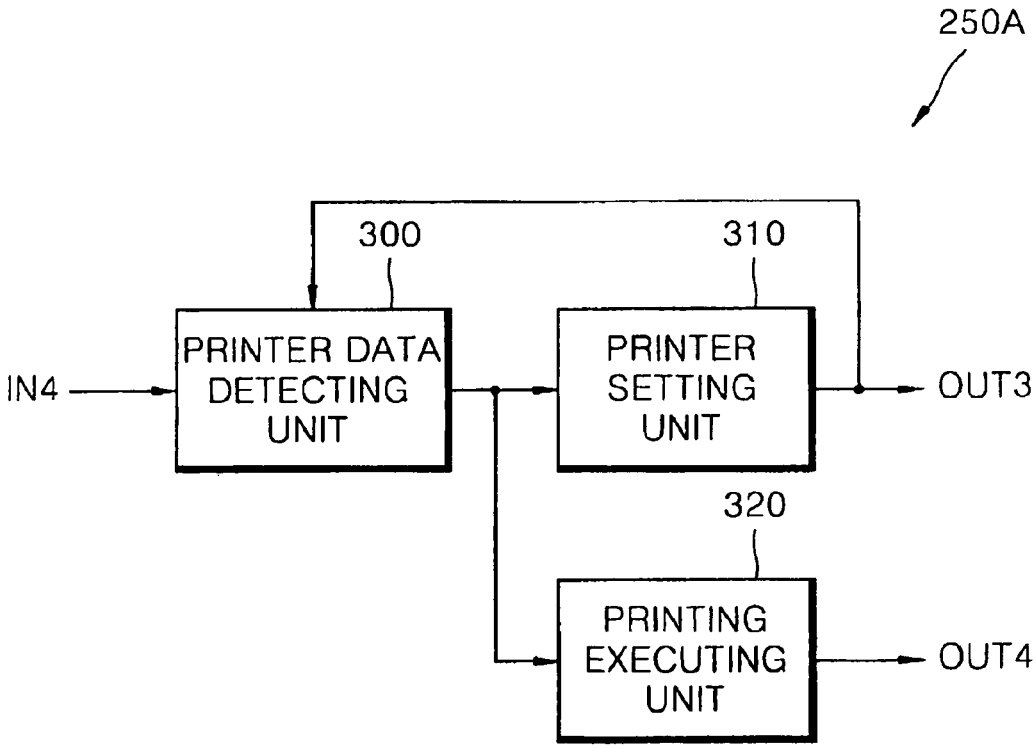
FIG. 8 is a block diagram of the printer operation executing unit of FIG. 7, according to an embodiment of the present invention.

FIG. 8 is a block diagram of the printer operation execution unit 250 of FIG. 7, according to an embodiment 250A of the present invention. The embodiment 250A comprises a printer data detecting unit 300, a printer setting unit 310, and a printing executing unit 320. The printer data detecting unit 300 performs operations 90 and 94 by detecting if the data received from the input data analyzer 200 at an input port IN4 is to-be-printed printer data or setup command printer data, and outputs a detection result.

If the to-be-printed printer data or the setup command printer data is input via the input port IN4, the printer data detecting unit 300 detects the input data and transmits a detection result according to the type of printer data (i.e., to-be-printed data or setup command data) to the printer setting unit 310 or the printing executing unit 320 (as the case may be). In case setup command printer data is input at IN4, the printer data detecting unit 300 outputs a setting detection result to the printer setting unit 310 and the printer data detecting unit 300 receives a setting result from the printer setting unit 310. In response to the setting result received from the printer setting unit 310, the printer data detecting unit 300 detects whether a setup command printer data has been applied and based upon the setting result outputs a printing detection result to the printing executing unit 320.

The printer setting unit 310 performs operation 92 by setting up a printer according to the setup command printer data in response to the setting detection result of the printer data detecting unit 300. In particular, in response to the setting detection result from the printer data detecting unit 300, the printer is setup and a printer setup result is output to the output port OUT3 and transmitted to the printer data detecting unit 300.

The printing executing unit 320 performs operation 96 by printing the to-be-printed printer data in response to the printing detection result of the printer data detecting unit 300. In particular, in response to the printing detection result from the printer data detecting unit 300, a printing execution result is output to the output port OUT4.

As described above, in a method and apparatus of the present invention for printing accessed data over a network using a virtual machine applet, data written in various kinds of languages on the Internet can be transmitted to a printer of a computing device and printed by the printer without installing a printer driver in the computing device, such as a computer or a mobile communication apparatus, like a PDA. Also, a desired printer setup by a user can be achieved without a printer driver. In other words, the XML data containing to-be-printed data accessed from the Internet (or a network) can describe/define information to control and feed to be-printed data to a printing unit, thereby having a benefit of obviating installation of a printer driver program. Accordingly, the present invention provides a printing system that receives accessed Internet data written in any language and directly controls a printing unit according to the received data to print the received data. More particularly, the present invention provides a computer system printing accessed data over a network using a virtual machine applet accessed by a printer. For example, the present invention can be implemented as a printer printing received data using an XML virtual machine applet. The processes of the present invention as embodied in a computing device and a printer that is in communication with the computing device can be implemented in computing hardware and/or software.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of printing accessed data over a network using a virtual machine applet in a printer connected to a computer, the method comprising:

transforming to-be-printed data accessed through the network or setup command data for setting up a printer environment received from a user into to-be-printed [extension] *extensible* mark-up language (XML) data or setup command XML data, respectively, and transmitting the to-be-printed XML data or the setup command XML data to the printer; and interpreting the to-be-printed XML data or the setup command XML data via a virtual machine applet to execute printing or to set up the printer, respectively, wherein the interpreting of the XML data comprises:

determining whether received data is XML data;

determining whether the to-be-printed XML data or the setup command XML data exists, if determined that the received data is the XML data;

producing to-be-printed printer data or setup command printer data from the to-be-printed XML data or the setup command XML data, respectively, using as the virtual machine applet an XML virtual machine applet interpreting XML data, if determined that the to-be-printed XML data or the setup command XML data exists;

distinguishing the produced to-be-printed printer data from the produced setup command printer data; and executing printing or setting up the printer with the printer data.

2. The method of claim 1, wherein the XML virtual machine applet stores a template of the to-be-printed printer data as data, and the producing of the to-be-printed printer data further comprises locating the to-be-printed XML data in the template of the to-be-printed printer data.

3. A method of printing accessed data over a network using a virtual machine applet in a printer connected to a computer, the method comprising:

transforming to-be-printed data accessed through the network or setup command data for setting up a printer environment received from a user into to-be-printed extension mark-up language (XML) data or setup command XML data, respectively, and transmitting the to-be-printed XML data or the setup command XML data to the printer;

interpreting the to-be-printed XML data or the setup command XML data via a virtual machine applet to execute printing or to set up the printer, respectively; and transforming a virtual machine applet accessed over a network into an XML virtual machine applet and allowing access to the XML virtual machine applet by the printer, wherein the accessed XML virtual machine applet interprets the transmitted XML data, wherein the interpreting of the XML data comprises:

determining whether received data is XML data;

determining whether the to-be-printed XML data or the setup command XML data exists, if determined that the received data is the XML data;

producing to-be-printed printer data or setup command printer data from the to-be-printed XML data or the setup command XML data, respectively, using as the virtual machine applet an XML virtual machine applet interpreting XML data, if determined that the to-be-printed XML data or the setup command XML data exists;

distinguishing the produced to-be-printed printer data from the produced setup command printer data; and executing printing or setting up the printer with the printer data.

4. The method of claim 1, further comprising:

transforming the virtual machine applet accessed through a network into an XML virtual machine applet;

transmitting the XML virtual machine applet to the printer; and storing the XML virtual machine applet in the printer.

5. The method of claim 4, wherein the storing of the XML virtual machine applet comprises:

determining whether the received data is XML data;

determining whether received XML data is the XML virtual machine applet, if determined that the received data is the XML data; and storing the XML virtual machine applet, if determined that the received data is the XML virtual machine applet.

6. The method of claim 1, wherein receipt of the printer data comprises:

determining whether the setup command printer data exists;

setting up the printer if determined that the setup command printer data exists;

determining whether the to-be-printed printer data exists; and executing printing if determined that the to-be-printed printer data exists.

7. An apparatus printing accessed data over a network using a virtual machine applet in a printer connected to a computer, the apparatus comprising:

a printer setup interface receiving a setup command for setting up a printer environment from a user and outputting setup command data;

an XML data transformation/transmission unit transforming to-be-printed data accessed through the network or the setup command data received from the user into to-be-printed XML data or setup command XML data, respectively, and transmitting the to-be-printed XML data or the setup command XML data to the printer; and an XML data processor interpreting the to-be-printed XML data or the setup command XML data via a virtual machine applet to execute printing or to set up the printer, wherein the XML data processor comprises:

an input data analyzer determining whether received data is XML data, the to-be-printed printer data or the setup command printer data and outputting a first signal result;

an XML data analyzer determining whether the XML data is the to-be-printed XML data or the setup command XML data in response to the first signal result and outputting a second signal result;

a virtual machine applet storage unit storing as the virtual machine applet an XML virtual machine applet interpreting XML data;

a virtual machine applet operator storing or fetching the XML virtual machine applet in response to the second signal result;

an execution data producer receiving the XML virtual machine applet from the virtual machine applet operator, producing to-be-printed printer data or setup command printer data from the to-be-printed XML data or the setup command XML data, respectively, using the received XML virtual machine applet, and outputting the to-be-printed printer data or the setup command printer data to the input data analyzer; and a printer operation executing unit executing printing or setting up the printer using the produced to-be-printed printer data or the produced setup command printer data.

8. An apparatus printing accessed data over a network using a virtual machine applet in a printer connected to a computer, the apparatus comprising:

a printer setup interface receiving a setup command for setting up a printer environment from a user and outputting setup command data;

an XML data transformation/transmission unit transforming to-be-printed data accessed through the network or the setup command data received from the user into to-be-printed XML data or setup command XML data, respectively, and transmitting the to-be-printed XML data or the setup command XML data to the printer; and an XML data processor interpreting the to-be-printed XML data or the setup command XML data via a virtual machine applet to execute printing or to set up the printer, wherein the XML data processor comprises:

an input data analyzer determining whether received data is XML data, the to-be-printed printer data or the setup command printer data and outputting a first signal result;

an XML data analyzer determining whether the XML data is the to-be-printed XML data or the setup command XML data in response to the first signal result and outputting a second signal result;

a virtual machine applet storage unit storing as the virtual machine applet an XML virtual machine applet interpreting XML data;

a virtual machine applet operator storing or fetching the XML virtual machine applet in response to the second signal result;

an execution data producer receiving the XML virtual machine applet from the virtual machine applet operator, producing to-be-printed printer data or setup command printer data from the to-be-printed XML data or the setup command XML data, respectively, using the received XML virtual machine applet, and outputting the to-be-printed printer data or the setup command printer data to the input data analyzer; and a printer operation executing unit executing printing or setting up the printer using the produced to-be-printed printer data or the produced setup command printer data, wherein the XML data transformation/transmission unit transforms a virtual machine applet accessed through a network into an XML virtual machine applet and transmits the XML virtual machine applet to the virtual machine applet storage unit, and wherein the XML data processor interprets the transmitted XML data using the XML virtual machine applet.

9. The apparatus of claim 7, wherein the input data analyzer determines whether the received data is XML data and outputs a third signal result; the XML data analyzer determines whether the received data is the XML virtual machine applet in response to the third signal result and outputs a fourth signal result; and the virtual machine applet operator stores the XML virtual machine applet in the virtual machine applet storage unit in response to the fourth signal result.

10. The apparatus of claim 7, wherein the XML virtual machine applet comprises a template of the to-be-printed printer data, and the execution data producer produces the to-be-printed printer data by locating the received to-be-printed XML data in the template of the to-be-printed printer data.

11. The apparatus of claim 7, wherein the printer operation executing unit comprises:

a printer data detecting unit detecting whether data received from the input data analyzer is the to-be-printed printer data or the setup command printer data and outputting a detection result;

a printer setting unit setting up the printer according to the setup command printer data in response to the detection result; and a printing executing unit printing the to-be-printed printer data in response to the detection result.

*12. A method of printing accessed data over a network using an applet in a printer, the method comprising:*

*transforming to-be-printed data accessed through the network or setup command data for setting up a printer environment received from a user into to-be-printed extensible mark-up language (XML) data or setup command XML data, respectively, and transmitting the to-be-printed XML data or the setup command XML data to the printer;*

*accessing data over the network using the applet in the printer;*

*determining if the accessed data includes to-be-printed XML data or setup command XML data;*

*interpreting the to-be-printed XML data or the setup command XML data to execute printing or to set up the printer, respectively,*

*wherein the interpreting of the XML data comprises:*

*determining whether accessed data is XML data;*

*determining whether the to-be-printed XML data or the setup command XML data exists, if it is determined that the accessed data is the XML data;*

*producing to-be-printed printer data or setup command printer data from the to-be-printed XML data or the setup command XML data, respectively, by interpreting XML data, if it is determined that the to-be-printed XML data or the setup command XML data exists; and*

*executing printing or setting up the printer with the printer data.*

*13. The method of claim 12, further comprising:*

*determining if the accessed data includes an applet; and*

*storing the applet in a storage unit if the accessed data includes an applet.*

*14. A printing apparatus to print data accessed over a network using an applet, the printing apparatus comprising:*

*a printer interface to access to-be-printed XML data or setup command XML data over the network using the applet; and*

*an XML data processor to interpret the to-be-printed XML data or the setup command XML data accessed over the network using the applet, wherein the XML data processor comprises:*

*an input data analyzer to determine whether accessed data is XML data;*

*an XML data analyzer to determine whether the XML data is the to-be-printed XML data or the setup command XML data, if it is determined that the accessed data is the XML data;*

*an execution data producer to produce to-be-printed printer data or setup command printer data from the to-be-printed XML data or the setup command XML data, respectively, by interpreting the XML data, and outputting the to-be-printed printer data or the setup command printer data; and*

*a printer operation executing unit to execute printing or setting up the printing apparatus using the produced to-be-printed printer data or the produced setup command printer data.*

* * * * *